(12) United States Patent
Jacobs et al.

(10) Patent No.: US 8,021,597 B2
(45) Date of Patent: Sep. 20, 2011

(54) METHOD AND APPARATUS FOR PRODUCING PLASTIC CONTAINERS

(75) Inventors: Jan Peter Jacobs, Lohmar (DE); Stefan Keusch, Brühl (DE)

(73) Assignee: Mauser-Werke GmbH, Brühl (DE)

( * ) Notice: Subject to any disclaimer, the term of this patent is extended or adjusted under 35 U.S.C. 154(b) by 0 days.

(21) Appl. No.: 12/595,009

(22) PCT Filed: Sep. 5, 2008

(86) PCT No.: PCT/EP2008/007627
§ 371 (c)(1),
(2), (4) Date: Oct. 7, 2009

(87) PCT Pub. No.: WO2009/040009
PCT Pub. Date: Apr. 2, 2009

(65) Prior Publication Data
US 2010/0052208 A1    Mar. 4, 2010

(30) Foreign Application Priority Data
Sep. 21, 2007 (DE) .................... 20 2007 013 318

(51) Int. Cl.
*B29C 47/20* (2006.01)
(52) U.S. Cl. .............. 264/540; 264/173.16; 264/173.18; 264/177.16; 264/209.8; 425/380; 425/465

(58) Field of Classification Search .................. None
See application file for complete search history.

(56) References Cited

U.S. PATENT DOCUMENTS

| 4,874,305 A * | 10/1989 | McGill et al. .............. 425/131.1 |
| 5,088,909 A | 2/1992 | Laarmann |
| 2004/0183224 A1 * | 9/2004 | Balzer et al. ............. 264/171.26 |

FOREIGN PATENT DOCUMENTS

| DE | 38 44 605 A1 | 2/1990 |
| DE | 91 07 812 U1 | 10/1991 |
| DE | 41 36 766 A1 | 5/1993 |
| DE | 196 05 890 A1 | 8/1997 |
| DE | 202 06 436 U1 | 9/2002 |
| EP | 0 333 956 | 9/1989 |
| EP | 0 491 093 A | 6/1992 |

* cited by examiner

*Primary Examiner* — Monica A Huson
(74) *Attorney, Agent, or Firm* — Henry M. Feiereisen; Ursula B. Day

(57) ABSTRACT

The invention relates to a method and a device for the production of blow-molded two- or multi-layer containers made of thermoplastic, and a plastic container produced accordingly, having view strips, particularly for storage and for transport of contents. To this end, molten plastic material is deflected in an extrusion head (10) from the inner, natural-colored layer (34) of the tubular preform (18) into the outer layer (36) in a process technical step, and incorporated there, whereby a view strip (24) is formed in the colored outer plastic layer (36).

9 Claims, 3 Drawing Sheets

METHOD AND APPARATUS FOR PRODUCING PLASTIC CONTAINERS

CROSS-REFERENCES TO RELATED APPLICATIONS

This application is the U.S. National Stage of International Application No. PCT/EP2008/007627, filed Sep. 5, 2008, which designated the United States and has been published as International Publication No. WO 2009/040009 and which claims the priority of German Patent Application, Serial No. 20 2007 013 318.9, filed Sep. 21, 2007, pursuant to 35 U.S.C. 119(a)-(d).

BACKGROUND OF THE INVENTION

The invention relates to a method and an apparatus for producing blow-molded two-layer or multilayer containers made of a thermoplastic material and plastic containers produced with this method having viewing strips, in particular for storing and transporting liquid contents.

Such a plastic container has typically vertical container walls with a horizontal container lid and base, wherein a gas- and liquid-tight closable fill and drain opening is disposed at least in the container lid or the container cover.

The plastic container can be formed as a canister, fassett, bunged barrel with lid and clamping ring, or as a large volume interior container of a pallet container, wherein this type of container typically includes a bottom drain fitting.

Frequently, plastic containers—with respect to multilayer containers, at least the outer layer—are colored, for example blue bunged barrels or black plastic containers colored with carbon black with an electrically dischargeable outer layer.

It is desirable to be able to identify at any time the respective fill or drain level of the container of plastic containers having a colored outer layer. For this purpose, colored plastic containers are typically provided with a narrow vertical viewing strip made of natural color (virgin) plastic, through which the respective level of the contents in the container can be ready identified. However, producing plastic containers with a viewing strip by blow molding is somewhat complex and requires a corresponding additional structural configuration of the extrusion head (continuous or discontinuous) and a corresponding separate extruder for the material of the viewing strip.

Another field of application concerns the storage and transport of flammable liquids. For example, when filling or emptying a pallet container (DE 196 05 890 A1) or more generally, when stirring liquids in plastic containers for the purpose of mixing and the like, electric charges generated by friction between the liquid and the inner container surface are discharged to ground via an electrically conducting outside coating of the inner container and the metallic support frame (steel pallet). This prevents an electric discharge between the plastic in a container and the outer frame formed by a metal lattice, which may cause sparking capable of igniting flammable content of the pallet container and of explosive mixtures of gases and vapors in enclosed spaces. Disadvantageously, conventional pallet containers do not have a viewing strip, so that the fill level cannot be identified with optical monitoring due to the black color of the inner plastic container.

DE 38 44 605 discloses a pallet container with at least one viewing strip is made of a translucent or transparent plastic material, which forms a unit with the black colored plastic material; a level indicator is provided next to the viewing strip. The conventional complex machine configuration is required for producing the plastic container with inserted viewing strip.

DE 41 36 766 discloses a multilayer container wall with an outer colored container layer with an interrupted layer region in form of a strip. The strip-shaped interrupted layer region is materially connected with the colored plastic material of the container wall. The corresponding apparatus for discontinuous production of a tubular preform for blow molding the containers is described in the published document DE-U-91 07 812.

DE 202 06 436 another pallet container with a multilayer inner container, with a permanently antistatic outer layer made of carbon black with at least one integrated viewing strip made of transparent plastic material. For example, EP 0 333 956 B1 describes an apparatus for producing plastic containers with a viewing strip embodied in an extrusion storage head.

A drawback common to all conventional multilayer embodiments is the provision of a continuous viewing strip made of the colorless plastic material of the inner layer. Both the apparatus and the method for fabricating a viewing strip of this type are quite complex. For example, when associating the viewing strip and the volume graduation, the circumferential position of the viewing strip of the inner container must be exactly matched to the circumferential position of the volume graduation. Moreover, an exact vertical orientation of the viewing strip on the inner container is difficult to maintain due to different degrees of expansion when the inner container is manufactured by blow molding.

SUMMARY OF THE INVENTION

It is therefore an object of the present invention to provide a corresponding apparatus and a method, which allows a simple and cost-effective manufacture of a colored plastic container with a viewing strip, wherein an additional extruder with lines carrying the molten plastic material for the viewing strip is no longer required. In addition, the apparatus of the invention should have a simple design and should be constructed so that it can be installed in existing multilayer extrusion heads even at a later date.

This object is attained in accordance with the invention by an extrusion head for producing blow-molded multilayer hollow plastic bodies, with a housing, on which two or more fittings for extruders are provided, with molten plastic materials being supplied through the fittings, the molten elastic materials being distributed along the circumference through two or more circumferential distributors to form a two-layer or multilayer tubular preform, wherein the preform flows through a cylindrical reservoir and can be elected through a controllable annular nozzle, wherein the ejected tubular reform is provided with a viewing strip, wherein an additional fitting is provided on the side of the housing (12) below the circumferential distributor and above the annular nozzle, with a hollow tube being inserted through the fitting into the cylindrical reservoir, wherein the hollow tube has on the inside of the reservoir an upward pointing inlet opening and on the outside of the reservoir a downward pointing outlet opening, through which plastic material can be deflected and incorporated from the inner layer in the colored outer layer for providing the viewing strip.

According to the invention, colorless plastic material is partially removed with a suitable device from the inner layer in the annular gap of the extrusion head shortly before the material exits from the annular nozzle, is deflected and rerouted in the radial direction and introduced into the separate outer layer (transfer of virgin material from the inner layer to the outer layer).

The subsequent dependent claims recite advantageous modified embodiments of the invention.

With respect to the apparatus, the invention includes an extrusion head for producing blow-molded multilayer hollow plastic bodies, with a housing provided with two or more fittings for extruders, wherein molten plastic materials are supplied through the fittings. The molten plastic materials are distributed through two or more circumferential distributors along the circumference to form a two-layer or multilayer tubular preform. The preform flows through a cylindrical reservoir and can be ejected through a controllable annular nozzle, whereby the ejected tubular reform is provided with a viewing strip. An additional fitting is provided on the side of the housing below the circumferential distributor and above the annular nozzle. A hollow tube is inserted through the fitting into the cylindrical reservoir, whereby the hollow tube an upwardly pointing inlet opening facing the inner surface of the reservoir and a downwardly pointing outlet opening facing the outer surface of the reservoir. Plastic material can hereby be deflected from the inner layer to the colored outer layer for incorporating the plastic material from the inner layer in the colored outer layer for providing the viewing strip.

In an embodiment of the invention, a helical screw with a drive is provided inside the hollow tube for transporting plastic material. The quantity of plastic material withdrawn from the inner layer of the tubular preform can then be easily controlled and changed. The helical screw can be driven, for example, with a hydraulic motor or an electric motor.

According to another embodiment of the invention, the hollow tube may be pulled out of the housing and the corresponding additional fitting may be constructed to be closable with an applied lid or solid plug. In this way, depending on the requirements, the extrusion head of the invention can be used to produce plastic containers with or without viewing strip.

Advantageously, the hollow tube with the helical screw and the drive may be configured as a retrofit kit that can be installed in any existing extrusion head. The extrusion head can be configured as a continuous tubular head (or Conti-Head) or as discontinuous extrusion head with injection piston (=storage head, Accu-Head). Manufacturers of blow-molded plastic hollow bodies can then retrofit their existing blow molding machines in a simple and cost-effective manner so that—depending on the requirements—different plastic containers, such as plastic bunged barrels or lidded barrels, can be manufactured with or without a viewing strip, without requiring costly retrofitting with an additional extruder.

According to another embodiment of the invention, the hollow tube with the helical screw may be configured for movement in the radial direction and may advantageously also be provided with a corresponding drive for movement in the radial direction.

With respect to the method, according to the invention, molten plastic material is deflected inside the cylindrical reservoir of the extrusion head from the inner layer to the colored outer layer and incorporated in the colored outer layer for providing the viewing strip. Optionally, deflection and incorporation of the molten plastic material from the inner layer in the colored outer layer for providing the viewing strip may be performed only sequentially (discontinuously) such that the viewing strip is disposed only in the vertical wall of the finished blown container and not in the lid and bottom of the finished blown container.

Additional advantages: Deflecting the material from the inside to the outside inside the tubular wall of the preform eliminates the typical continuous separation lines (vertical separation lines in the container wall) in the wall of the finished blown product, and hence also eliminates the disadvantageous effects on the performance data (e.g. drop test, hydraulic interior pressure test, etc.) of the finished container. The inner surface of the tube or of the finished container remains undisturbed and is not separated. Containers having different volumes from about 60 liters to about 1000 liters can be produced with an extrusion head according to the invention with an inserted hollow tube and a driven helical screw, for instance canisters, drums or large volume plastic inner containers for pallet containers. An additional extruder or an additional mass storage device (for sequential operation) is then no longer required.

BRIEF DESCRIPTION OF THE DRAWING

The invention will now be described in more detail with reference to an exemplary embodiment schematically illustrated in the drawings.

DETAILED DESCRIPTION OF PREFERRED EMBODIMENTS

Figure 1:
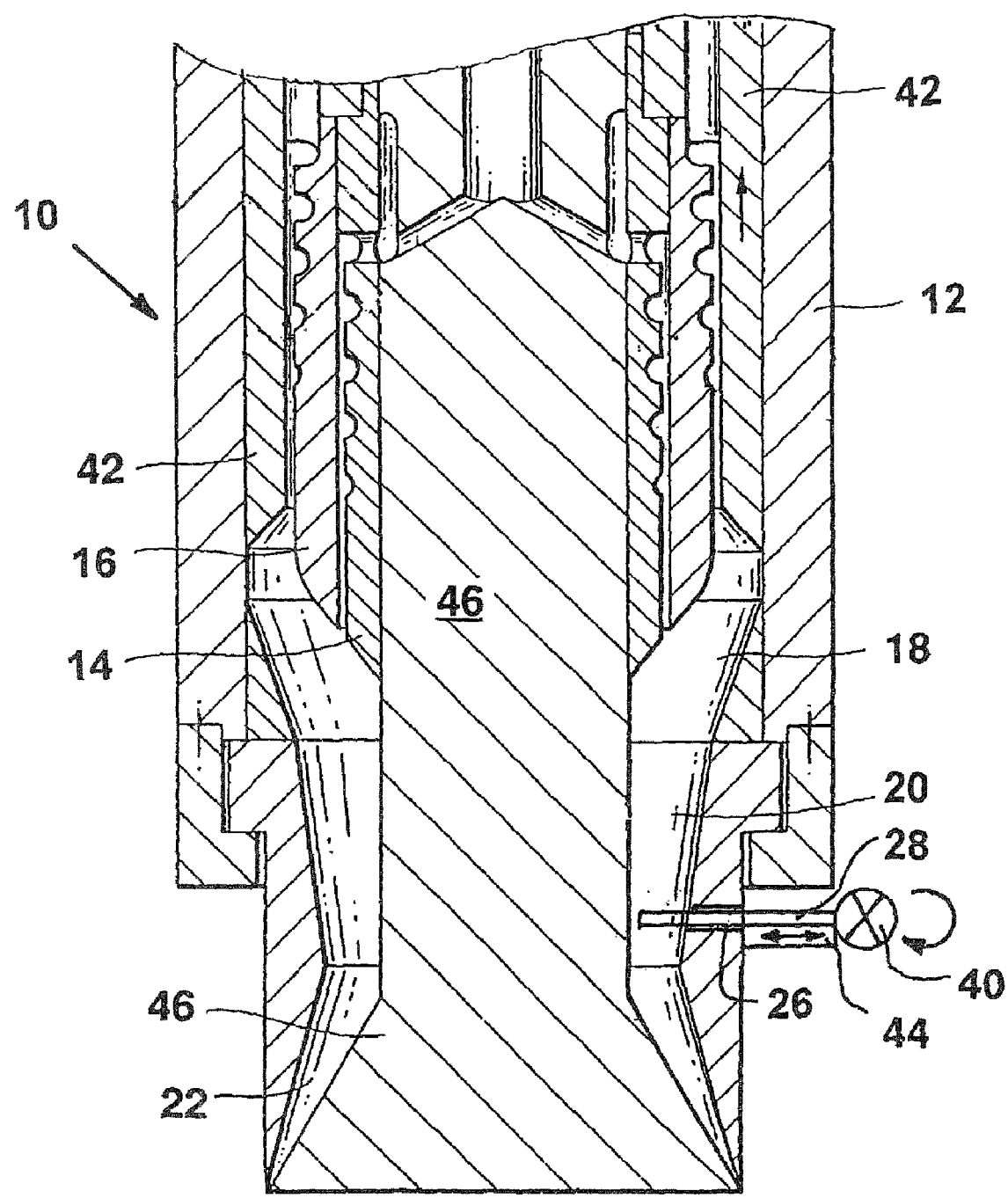
FIG. 1 shows an extrusion head according to the invention with schematically indicated transverse conveyor for the melt.

FIG. 1 shows with the reference numeral 10 an extrusion head for producing blow-molded two-layer plastic hollow bodies embodied as a storage head (Accu-Head) with a housing 12, on which (not shown in the partial view) two connections for two extruders are provided. Two circumferential distributors 14, 16 are supplied with molten plastic material from the connected extruders. The two circumferential distributors 14, 16 are constructed as concentric cylinder sleeves with built-in helical channels for circumferentially distributing the plastic material flows that are received from the extruders as a full strand. The circumferential distributor 16 is covered by an additional cylinder sleeve 42. The three concentric cylinder sleeves 14, 16, 42 with interior, or covered, helical channels are fixed in position relative to one another and form together the so-called ejection piston. The ejection piston encompasses a central mandrel 46 and is supported in the housing for vertical movement and provided with a corresponding ejection drive.

The plastic material, which is completely distributed about the circumference, exits at the bottom end of the cylinder sleeves or of the ejection piston as a two-layer tubular preform 18, flows through a cylindrical reservoir 20 in which a viewing strip is applied during the extrusion process, and is then ejected from the extrusion head 10 through a controllable annular nozzle 22. In the discontinuous operating mode of the storage head, the tubular preform 18 is sequentially ejected from the reservoir 20 by the ejection piston through the controllable annular nozzle 22. The central mandrel 46 is also movably arranged in the housing 12. By lowering the cone-shaped mandrel tip, the nozzle gap of the annular nozzle 22 opens and widens; when the cone-shaped mandrel tip is raised, the nozzle gap narrows and can close completely. The extrusion head 10 can, of course, also be designed as continuous extrusion head with continuous tube discharge. According to the present invention, a particular device for redistributing the material is arranged inside the reservoir 20, below the circumferential distributors 14, 16 and above the controllable annular nozzle 22. Redistribution of the material is performed by a hollow tube 28 such that, as viewed in the radial direction from the inside to the outside, plastic material is initially withdrawn from the inner layer 34, which consists of original natural material, of the almost finished preform 18, deflected in the radial direction and pushed to the outside, where it is then again deflected to flow in the axial direction and introduced into the outer colored layer 36 of the preform 18 as a transparent viewing strip.

As a result of the partial redistribution of the material, slight changes in the layer thickness occur in a local region about the introduced viewing strip (decrease in the thickness of the inner layer and corresponding increase of the outer layer), which is immaterial for the finished product and has no disadvantageous effect on the mechanical performance (inside pressure test, drop resistance, stack loading) of the container.

With particular container designs, for example, closed bunged barrels with high stretching rates of the tubular preform in regions that are offset by 90° with respect to the mold separation plane in the injection mold halves, it is desirable to arrange the viewing strips in a particular circumferential position. To this end, the lower housing part 48, in which the hollow tube 28 for providing the viewing strip 24 is arranged, is rotatably attached on the housing 12 of the extrusion head, so that the viewing strip in the ejected preform can be positioned exactly in the desired position, for example at the mold separation plane. The lower housing part 48 can also be equipped with a stepping motor for rotating the lower housing part in both rotation directions and thereby adjust the position of the viewing strip with reference to the blow-mold and its position in the blown container, respectively.

Figure 2:
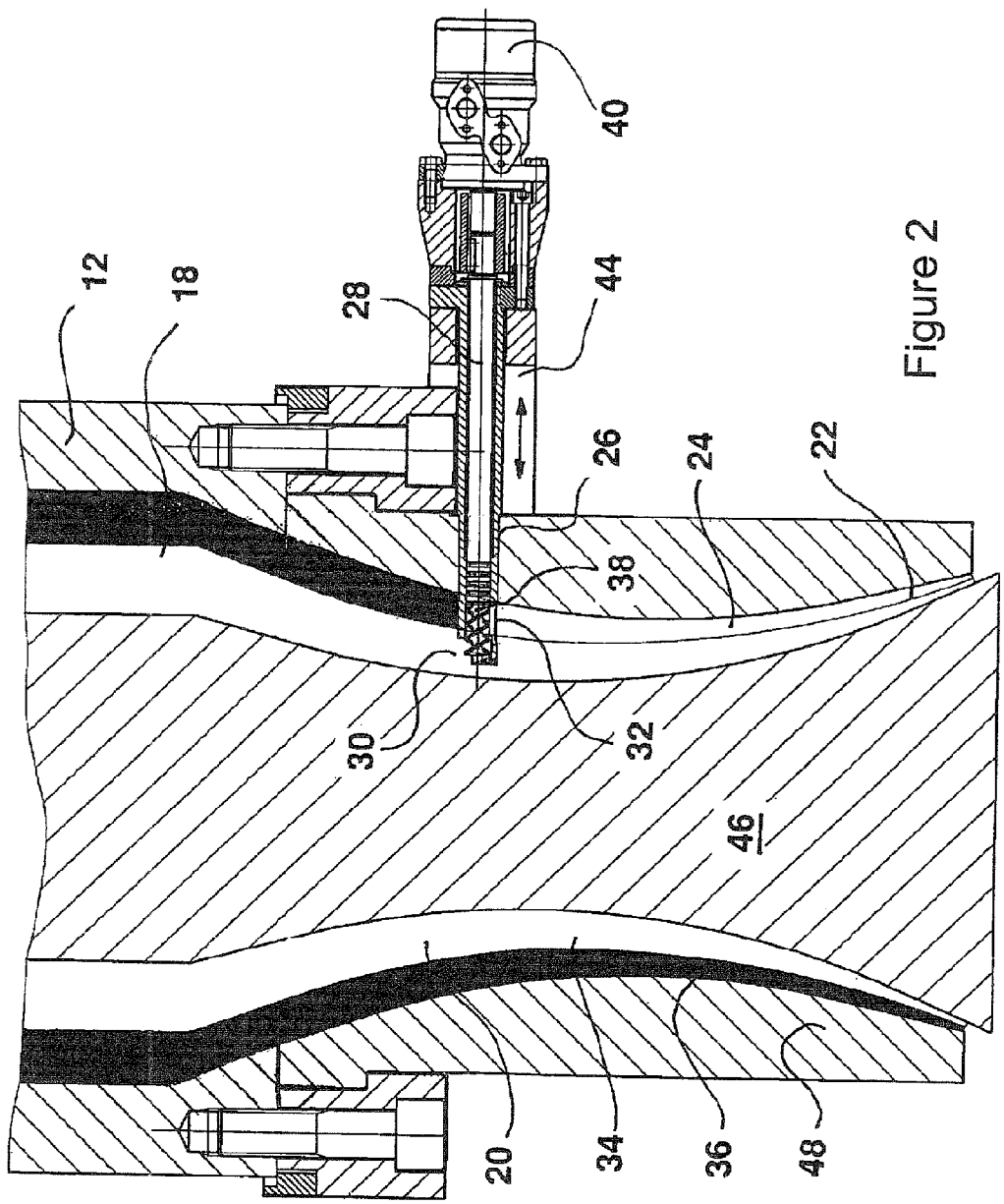
FIG. 2 shows the lower part of an extrusion head according to the invention with transverse melt conveyor on an enlarged scale.

In an exemplary actual design of medium size, the hollow tube 28 inserted in the lower housing part 48 has an outside diameter of about 45 mm and extends into the reservoir 20 to a depth of about 50 mm. The upper opening 30 has a width of about 30 mm and about the same length, wherein the lower opening 32 is about 35 mm long, but only 10 mm wide. FIG. 2 shows in more detail the lower part of the extrusion head with a transverse melt conveyor implemented as a helical screw 38. The helical screw 38 is preferably designed as a double-lead screw and has a length of only about 55 mm. The hollow tube 28 is completely sealed to the outside at the driveshaft behind the helical screw 38 by corresponding sealing rings.

With colored containers having a two-layer or three-layer wall structure, the outer layer colored with admixed dye pigments or with carbon black is relatively thin, since dye pigments or carbon black are relatively expensive. Advantageously, the colored outer layer has a thickness of only 5 to 20%, preferably about 10%, of the container wall.

The layer thickness of the inner layer made of new material (HD-PE High Density Poly Ethylene) should not be thinner than about 50%. With a three-layer wall structure, the middle layer has a layer thickness between 20% and 60% and is typically made of high density polyethylene, whereby recycled pellets or ground material can be used (colorless or natural color HD-PE).

For use in explosive areas or with flammable content, the plastic containers are provided—through addition of carbon black—with a black, electrically conducting outer layer. This outer layer should also be as thin as possible to save costs.

Figure 3:
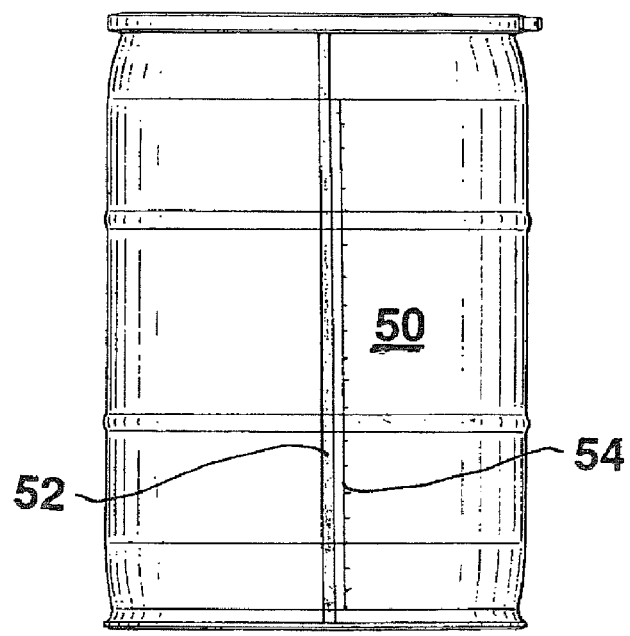
FIG. 3 shows a plastic lidded barrel with viewing strip.
Figure 4:
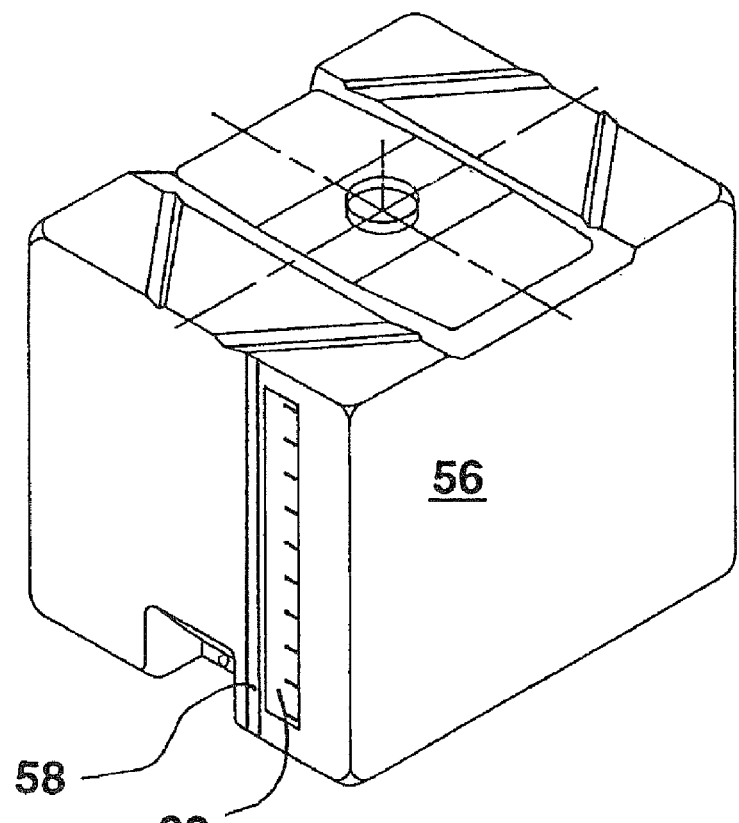
FIG. 4 shows a large volume plastic inner container with viewing strip.

FIG. 3 shows in form of an exemplary embodiment of a blow-molded container produced with the method of the invention a 220 liter plastic lidded barrel 50 with a viewing strip 52 and measuring graduation 54 in the vertical barrel wall. FIG. 4 shows a different exemplary embodiment in form of a large-volume plastic inner container 56 with viewing strip 58 and a measuring graduation 60 for a pallet container with a capacity of 1000 liters.

The viewing strip should have—when viewed in the circumferential direction—a width of about 10 mm to 20 mm, so that the respective the level of the liquid contents can be readily identified at any time.

What is claimed is:

1. A method for producing multilayer hollow plastic bodies to be blow-molded, comprising the steps of:
    feeding two or more molten plastic materials from extruders into an extrusion head;
    distributing the plastic materials with two or more circumferential distributors to form a two-layer or multilayer tubular preform;
    flowing the formed multilayer tubular preform through a cylindrical reservoir;
    inside the cylindrical reservoir, deflecting the molten plastic material from an inner layer of the two-layer or multilayer tubular preform to a colored outer layer of the two-layer or multilayer tubular preform within the cylindrical reservoir and incorporating the deflected molten plastic material in the colored outer layer to form a viewing strip; and
    ejecting the multilayer tubular preform with the viewing strip through a controllable annular nozzle into a mold for blow-molding the hollow plastic bodies.

2. The method of claim 1, wherein the steps of deflecting and incorporating the molten plastic material from the inner layer for applying the viewing strip in the colored outer layer are performed discontinuous, so that the viewing strip is applied only in a vertical wall section of a finished blow-molded multilayer hollow plastic body.

3. An extrusion head for producing blow-molded multilayer hollow plastic bodies, the extrusion head comprising:
    a housing having two or more fittings for extruders, the fittings supplying molten plastic material;
    two or more radially spaced circumferential distributors distributing the molten plastic material along a circumference to form a two-layer or multilayer tubular preform having at least one inner layer and at least one outer layer;
    a cylindrical reservoir through which the tubular preform flows;
    a controllable annular nozzle through which the tubular preform is ejected, with the ejected tubular preform having a viewing strip,
    a fitting disposed on the side of the housing intermediate the circumferential distributor and the annular nozzle;
    a hollow tube inserted radially through the fitting into the cylindrical reservoir, wherein the hollow tube has an inner end with an upward-pointing inlet opening proximate to a radially inner wall of the reservoir and a downward-pointing outlet opening proximate to a radially outer wall of the reservoir and a closed outer end, said inlet and outlet opening cooperating to deflect in a radial direction plastic material from the at least one inner layer of the two-layer or multilayer tubular preform to a the at least one outer layer of the two-layer or multilayer tubular preform for incorporation into the outer layer and application of the viewing strip, while allowing an unimpeded flow of the material of the at least one inner layer into the at least one outer layer.

4. The extrusion head of claim 3, further comprising a helical screw disposed inside the hollow tube, said helical screw driven by a first drive and transporting the plastic material from the at least one inner layer to the at least one outer layer of the two-layer or multilayer tubular preform.

5. The extrusion head of claim 3, wherein the hollow tube is constructed to be pulled out of the housing, with fitting constructed to be closable with an applied lid or a solid plug.

6. The extrusion head of claim 4, wherein the hollow tube with the helical screw and the drive is configured as a retrofit kit suitable for installation in an existing extrusion head.

7. The extrusion head of claim 4, wherein the hollow tube with the helical screw is adjustable in a radial direction of the extrusion head.

8. The extrusion head of claim 7, further comprising a second drive for adjusting the hollow tube with the helical screw in the radial direction.

9. The extrusion head of claim 4, wherein the housing comprises two housing parts, with a first stationary housing part including the fittings for the extruders and a second housing part including the inserted hollow tube and the helical screw, wherein the second housing part is movable in two rotation directions for adjusting purposes.

* * * * *